(12) United States Patent
Ellis et al.

(10) Patent No.: US 11,198,919 B2
(45) Date of Patent: Dec. 14, 2021

(54) WELLBORE TUBULAR AIR QUENCHING

(71) Applicant: National Oilwell Varco, L.P., Houston, TX (US)

(72) Inventors: David Martin Ellis, Cypress, TX (US); Luis Marcos Cadena, The Woodlands, TX (US); Christopher Alan Conrey, College Station, TX (US); Daryl Stevenson, Cypress, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 118 days.

(21) Appl. No.: 16/422,089

(22) Filed: May 24, 2019

(65) Prior Publication Data

US 2019/0276908 A1    Sep. 12, 2019

Related U.S. Application Data

(62) Division of application No. 14/682,723, filed on Apr. 9, 2015, now Pat. No. 10,344,346.

(51) Int. Cl.
| | |
|---|---|
| *C21D 1/42* | (2006.01) |
| *H05B 6/10* | (2006.01) |
| *C21D 9/08* | (2006.01) |
| *C21D 1/613* | (2006.01) |
| *C21D 1/62* | (2006.01) |
| *C21D 6/00* | (2006.01) |
| *C21D 9/50* | (2006.01) |

(52) U.S. Cl.
CPC .............. *C21D 9/085* (2013.01); *C21D 1/42* (2013.01); *C21D 1/613* (2013.01); *C21D 1/62* (2013.01); *C21D 6/00* (2013.01); *C21D 9/08* (2013.01); *C21D 9/505* (2013.01); *H05B 6/101* (2013.01); *Y02P 10/25* (2015.11)

(58) Field of Classification Search
CPC .......... C21D 9/085; C21D 1/42; C21D 1/613; C21D 1/62; C21D 6/00; C21D 9/08; C21D 9/505
See application file for complete search history.

(56) References Cited

U.S. PATENT DOCUMENTS

| | | | | |
|---|---|---|---|---|
| 4,834,344 | A * | 5/1989 | Hoetzl ................... | C21D 1/667 266/117 |
| 5,452,882 | A * | 9/1995 | Wunning ............... | C21D 1/613 266/117 |
| 6,394,793 | B1 * | 5/2002 | Bunge .................... | C21D 1/667 148/714 |
| 10,344,346 | B2 * | 7/2019 | Ellis ......................... | C21D 9/08 |

FOREIGN PATENT DOCUMENTS

| | | | | |
|---|---|---|---|---|
| GB | 1385243 A | * | 2/1975 | ............. C21D 9/085 |
| GB | 2026044 A | * | 1/1980 | ............... C21D 9/50 |

* cited by examiner

*Primary Examiner* — Scott R Kastler
(74) *Attorney, Agent, or Firm* — Conley Rose, P.C.

(57) ABSTRACT

A system for air quenching a heat treated element comprises a tubular component, an internal air quench device moveably disposed within the interior of the tubular component, and an external air quench device moveably disposed about the tubular component. The internal air quench device comprises a nozzle configured to induce an airflow within the tubular component. The external air quenching device can comprise an annular ring disposed about the tubular component that is configured to generate a cone of air about the tubular component.

18 Claims, 3 Drawing Sheets

WELLBORE TUBULAR AIR QUENCHING

CROSS-REFERENCE TO RELATED APPLICATIONS

This application is a divisional of and claims priority to U.S. patent application Ser. No. 14/682,723 (now U.S. Pat. No. 10,344,346), filed on Apr. 9, 2015 entitled "WELLBORE TUBULAR AIR QUENCHING," by David Martin Ellis, et al., which is incorporated herein by reference in its entirety for all purposes.

BACKGROUND

The fabrication and manufacture of goods from metals often results in the metals having a less than desirable metallurgical condition. To convert the metals to a desired condition, it is common to heat treat the metals. In heat treating, an object, or portion thereof, is heated to a suitably high temperature and subsequently cooled to ambient temperature. The temperature to which the metal is heated, the time of heating, as well as the rate of cooling or quenching, may be selected to develop the intended physical properties in the metal. For example, for normalization, steel is to be heated to a temperature above the transition range, to about 1600 degrees Fahrenheit and then cooled slowly, while tempering of steel also requires uniformly heating to a temperature below the transition range to a specified temperature, holding at that temperature for a designated time period then cooling in air or liquid.

SUMMARY

A system for air quenching a heat treated element comprises a tubular component, an internal air quench device moveably disposed within the interior of the tubular component, and an external air quench device moveably disposed about the tubular component. The internal air quench device comprises a nozzle configured to induce an airflow within the tubular component. The system can also include an induction coil disposed about the tubular component that is configured to heat the tubular and create a heat affected zone. The tubular component can comprise a drill pipe, a drill collar, a production pipe, a tool joint, or a downhole tool housing. The heat affected zone can include a weld line between two tubulars. The system can also include a compressed air source, the nozzle and the external air quench device can be in fluid communication with the compressed air source. The internal air quench device can be disposed a first longitudinal distance away from a centerline of the heat affected zone, the external air quench device can be disposed a second longitudinal distance away from the centerline of the heat affected zone, and a ratio of the first longitudinal distance to the second longitudinal distance ranges from about 0.05 to about 0.5. The external air quenching device can comprise an annular ring disposed about the tubular component, and the annular ring can be configured to generate a cone of air about the tubular component. The tubular component can have a wall thickness of up to about 3 inches.

In an embodiment, a method for air quenching a heat treated element comprises heating a portion of a tubular component to a treatment temperature, providing compressed air to a nozzle within an interior of the tubular component, inducing a combined airflow within the interior of the tubular component based on providing the compressed air to the nozzle, cooling an interior surface of the tubular using the combined airflow, providing a second amount of compressed air to an exterior air quenching device disposed about the tubular component, inducing an external combined airflow about an exterior of the tubular component, and cooling an exterior surface of the tubular using the external combined airflow. The combined airflow comprises a mixture of the compressed air and ambient air. The tubular component can be formed from a steel, and the treatment temperature can be greater than an austenitic transformation temperature of the steel. A ratio of a volume of the compressed air to a volume of the ambient air in the combined airflow can be between about 1:15 and about 1:25. The exterior air quenching device can comprise an annular ring, and the method can also include generating a cone of air from the annular ring. A ratio of a volume of the second amount of compressed air to a second volume of ambient air in the external combined airflow can be between about 1:15 and about 1:20. The external combined airflow can flow in a Coanda flow pattern along the exterior of the tubular component. The combined airflow within the interior of the tubular component can flow counter-current to the external combined airflow about the exterior of the tubular component. Cooling the interior surface and cooling the exterior surface can include proportionally cooling the interior surface and the exterior surface.

In an embodiment, a method for air quenching a heat treated element comprises heating a portion of a tubular component to a treatment temperature to create a heat affected zone, air quenching an interior surface of the tubular component in the heat affected zone to below a threshold temperature, air quenching an exterior surface of the tubular component in the heat affected zone to below the threshold temperature, and proportionally cooling the heat affected zone based on air quenching the interior surface and air quenching the exterior surface. A ratio of a rate of air quenching the exterior surface to a rate of air quenching the interior surface can be between about 0.5 to about 2.0. A time to reach the threshold temperature at the interior surface can be within about 20% of a time to reach the threshold temperature at the exterior surface. An initial temperature difference can be considered as a difference in a temperature between the interior surface and the exterior surface after heating the tubular component to the treatment temperature and before air quenching the interior surface or air quenching the exterior surface, and a final temperature difference can be considered a different in a temperature between the interior surface and the exterior surface when both the interior surface and the exterior surface are below the threshold temperature. A difference between the initial temperature difference and the final temperature difference can then be less than about 50° F.

These and other features will be more clearly understood from the following detailed description taken in conjunction with the accompanying drawings and claims.

BRIEF DESCRIPTION OF THE DRAWINGS

For a detailed description of exemplary embodiments of the invention, reference is now be made to the figures of the accompanying drawings. The figures are not necessarily to scale, and certain features and certain views of the figures may be shown exaggerated in scale or in schematic form, and some details of conventional elements may not be shown in the interest of clarity and conciseness.

DETAILED DESCRIPTION OF DISCLOSED EMBODIMENTS

Figure 1:
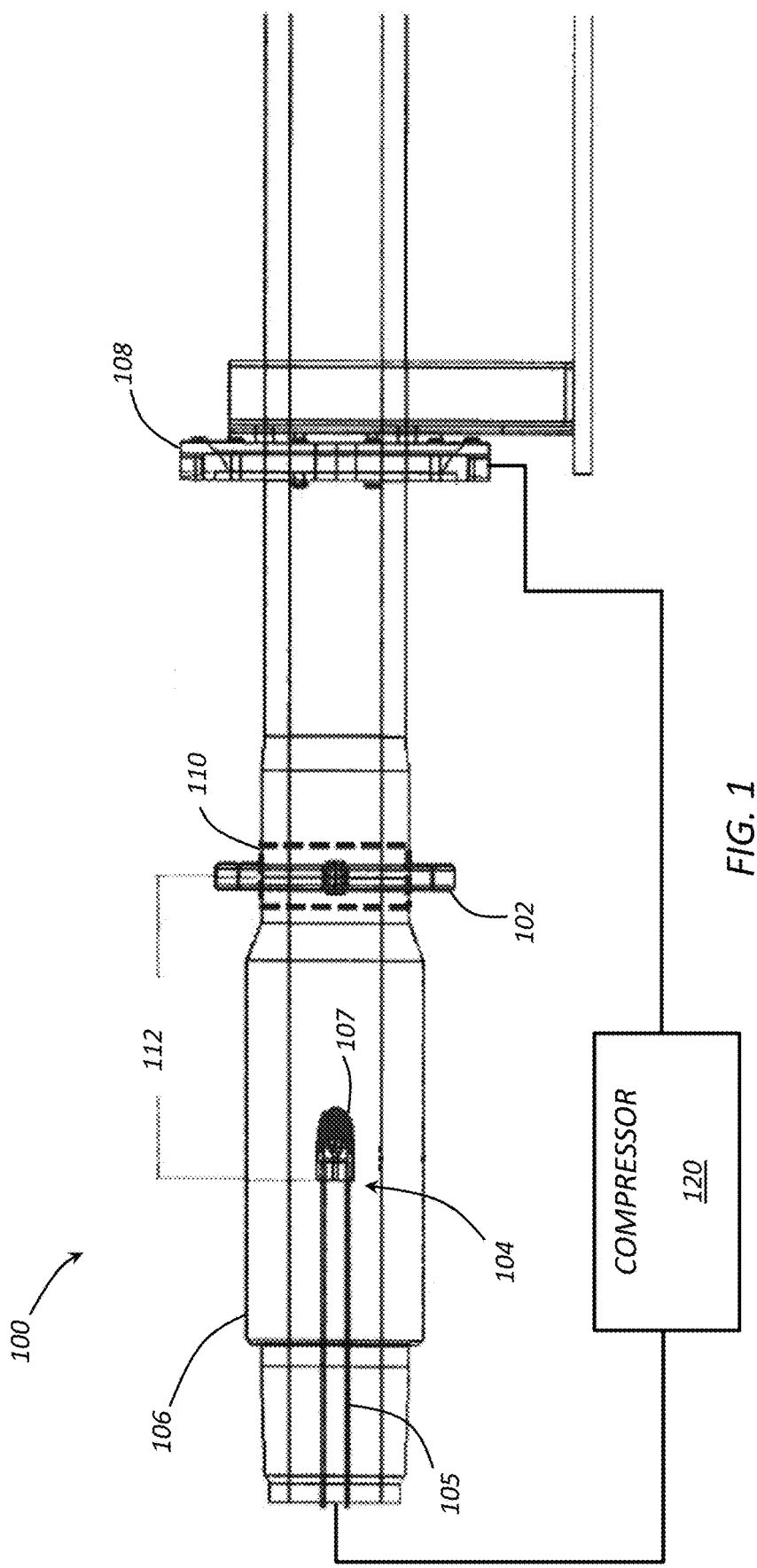
FIG. 1 shows a schematic diagram of a system for air quenching a tubular according to an embodiment.

In the drawings and description that follow, like parts are typically marked throughout the specification and drawings with the same reference numerals, respectively. The drawing figures are not necessarily to scale. Certain features of the disclosed exemplary embodiments may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of certain principles of the invention, and is not intended to limit the invention to the exemplary embodiments illustrated and described herein. It is to be fully recognized that the different teachings of the embodiments discussed infra may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". The various characteristics mentioned above, as well as other features and characteristics described in more detail below, will be readily apparent to those skilled in the art with the aid of this disclosure upon reading the following detailed description of the exemplary embodiments, and by referring to the accompanying drawings.

In the manufacture of tubulars, such as those employed in drilling of subsurface formations (e.g., tubulars used in a drill string), heat treating may be used to improve the metallurgical characteristics of selected portions of the tubular. For example, portions of the tubular along weld lines may be heat treated to relieve internal stresses caused by the welding and improve the strength of the tubular along the weld line.

In some post-weld heat treating of drill string tubulars, a selected portion of the wall of the tubular is heated above the transition temperature, using for example, an induction coil to heat the tubular and create a heat affected zone (HAZ). Once the tubular is heated above the transition temperature, the heat source is removed or turned off and the tubular can be cooled at a desired rate. In some systems, air may be directed at the heat affected zone. However, directing air at the heat affected zone may not provide a desired cooling rate. Further, the cooling rate for the exterior and the interior of the tubular may vary, thereby creating an uneven cooling pattern than can lead to a number of defects or insufficient material properties. When the tubular does not meet the appropriate standards, the tubular may need to be discarded, leading to a higher overall production cost.

Systems and methods are disclosed herein for providing an internal and external air quenching system for the heat affected zone. The air quenching may utilize a nozzle or other design to induce a larger airflow along the interior and/or exterior of the tubular. Rather than being directed at the heat affected zone, the nozzles may be designed to induce the airflow over the heat affected zone. This design has been found to result in an increased cooling rate, which may improve the material properties of the metal in the heat affected zone. Further, the use of the internal and external induced air flow rates may also allow the internal and external cooling rates to be similar, resulting in a more even and uniform cooling of the tubular. This may also allow for a thicker tubular to be heat treated to obtain the desired material properties.

FIG. 1 shows a schematic diagram of a system 100 for heat treating a tubular 106 in accordance with principles disclosed herein. The system 100 includes a heat source 102, and internal air quenching device 104, and an external air quenching device 108. The tubular 106 may comprise any metallic tubular. In some embodiments, the tubular 106 may comprise a wellbore tubular such as drill pipe, a drill collar, production pipe, one or more tool joints, a downhole tool housing, or any other tubular employed in drilling and/or production of subsurface formations. The tubular can comprise two or more separate tubular elements that are joined or coupled together. For example, the tubular 106 may comprise two wellbore tubulars that have been welded together. The tubular 106 can be heat treated to improve the material properties of the tubular. In some embodiments, the heat treated portion of the tubular 106 may comprise a weld line between two tubulars that have been welded together. The use of the heat treatment may then improve the mechanical and material properties of the resulting tubular at the weld line.

The heat source 102 is used to heat the tubular 106 or a portion thereof above the transformation temperature of the material and create a heat affected zone (HAZ) 110. The HAZ 110 generally includes the portion of the tubular that is heated above the transformation temperature. For example, the HAZ 110 may comprise the portion of the tubular 106 that is heated above the austenitic transformation temperature of steel. The HAZ 110 can extend from the exterior to the interior of the tubular 106 to allow the material properties to be affected across the entire thickness of the tubular 106. The thickness of the tubular 106 can vary, and may generally range between about ⅛ of an inch to about 2 inches though tubular components having a greater wall thickness can also be used. The HAZ 110 can range in length along the tubular 106 depending on the type and location of the heat source 106. In an embodiment, the HAZ 110 may range from about 1 inch to about 12 inches, or from about 2 inches to about 8 inches in length along the tubular 106. When a larger heat source 102 is present and/or multiple heat sources are present, the HAZ 110 can be longer than the lengths listed herein.

The heat source 102 can include any type device capable of heating the tubular 106 to the desired temperature. In an embodiment, the heat source 106 can include an induction coil, a flame source, and/or a laser. In general, the heat source may be configured to heat the tubular 106 without raising the temperature of the tubular above the melting point of the material. In an embodiment, the HAZ 110 may be heated to raise the temperature of the tubular to about 100° F. to about 900° F. above the transformation temperature of the material forming the tubular 106 and maintain the temperature for a desired treatment period. While the absolute temperature may vary depending on the specific composition of the material or materials used to form the tubular 106, the temperature of the tubular in the HAZ 110 may be raised to about 1,800° F. to about 2,900° F.

In an embodiment, the heat source 102 comprises one or more induction coils. The induction coil can be positioned about the tubular 106 such the induction coil surrounds a cylindrical portion of the tubular 106 and is configured to inductively heat the cylindrical portion of the tubular 106 from the exterior. In an embodiment, the induction coil may be capable of inductively heating any selected portion of the tubular 106. The induction coil can be positioned to inductively heat a cylinder of the tubular 102 to form the HAZ 110. For example, in FIG. 1, the coil can be centered on a weld line joining two abutting segments of the tubular 106. The induction coil may be generally toroidal in shape, and formed of one or more turns of copper tubing that provides a conductive path for current that energizes the coil, and a channel for pumping coolant through the coil. The induction coil may be wrapped in a refractory material that provides a housing for the coil. While described as including a single induction coil, two or more induction coils can be used to heat the tubular 106 from the exterior and/or interior.

One or more additional components may be present to control the heat source 102. For example, a controller can be coupled to the heat source 102 to control the rate of heating, the positioning of the heat source 102, and the like. The controller may also be used to maintain the HAZ 110 at the desired temperature for a desired amount of time prior to allowing the HAZ 110 to be quenched. A temperature sensor such as a pyrometer may also be used to provide a measure of the temperature of the tubular during the heating and quenching process.

The system 100 may also comprise a compressor 120. The compressor 120 may comprise one or more compressors to compress air to a higher than atmospheric pressure. The compressed air can be stored in one or more tanks or vessels for use with the interior air quenching device 104 and/or the external air quenching device 108. In generally, compressed air may comprise ambient air that has been pressurized to a higher pressure. In an embodiment, the compressed air may be pressurized and supplied to the interior air quenching device 104 and/or the external air quenching device 108 at pressure in the range of from about 20 psia to about 200 psia. As used herein, ambient air generally refers to the air found in the environment surrounding the tubular 106 and/or compressor 120. The ambient air may be at approximately atmospheric pressure and temperature at the particular time and location that the heat treatment is conducted. In an embodiment, ambient air is not compressed.

The system 100 also comprises an internal air quenching device 104. The internal air quenching device 104 is generally configured to provide an air flow within the interior of the tubular 106 as well as inducing a larger airflow from an end of the tubular 106. The larger induced airflow stream can contact an interior surface of the tubular 106 to air quench the HAZ once the heating cycle has been completed.

The internal air quenching device 104 may generally comprise an air lance 105 having an outer diameter that is less than the internal diameter of the tubular 106. The air lance 105 can be coupled to a nozzle 107 at one end. The other end of the air lance 105 can be in fluid communication with a source of compressed air to allow the compressed air to pass to the nozzle 107. The air lance 105 serves to support the nozzle 107 while also providing fluid communication between the nozzle 107 and a source of compressed air. The air lance 105 is generally configured to be moveably disposed within the interior of the tubular 106 so that the nozzle 107 can be inserted within the tubular 106 and positioned at or near the HAZ 110. Thus, air lance 105 is disposed in a position within tubular 106 and is configured to reciprocate within the interior of the tubular 106. As shown in FIG. 1, the nozzle 107 may be positioned at a distance 112 from the HAZ 110. In an embodiment, the nozzle 107 may be positioned at a distance 112 between about 6 inches and about 50 inches from the HAZ 110. The nozzle 107 may be positioned upstream of the HAZ 110 (e.g., upstream relative to the direction of travel of the air stream leaving the nozzle) so that an air stream leaving the nozzle may mix with the induced airflow prior to the combined air stream passing over the interior surface of the tubular 106 in the HAZ 110.

The nozzle 107 can be configured to convert the compressed air into an air jet directed towards the HAZ 110. The nozzle 107 can comprise any type of nozzle suitable for converting a pressurized gas into a higher velocity, lower pressure gas. In an embodiment, the nozzle may be configured to entrain ambient air with the pressurized air being emitted from the nozzle in the air jet. The air jet created by the nozzle 107 may be directed along the longitudinal axis of the tubular 106 with an outward deflection up to 45 degrees. This may allow the air jet to create a low pressure zone adjacent the nozzle 107 and entrain ambient air from outside of the tubular 106. In an embodiment, the nozzle 107 can create an air jet having a variety of flow patterns including a cone, jet, fan, or the like. The ambient air may then mix with the fluid jet to create a larger airstream passing through the HAZ 110. The large induced airflow may contact the interior surface of the tubular 106 in the HAZ 110 to quench the tubular to below the transition temperature of the material. The ratio of the volume of the compressed air passing through the nozzle 107 to form the fluid jet to the volume of ambient air entrained and drawn into the mixed stream may vary between about 1:15 to about 1:25. In an embodiment, the airflow from the nozzle may range from about 60 standard cubic feet per minute (SCFM) to about 135 SCFM. The airflow may vary based on a variety of factors such as the geometry of the tubular 106 and/or the specifics of the nozzle 107.

The system 100 also comprises an external air quenching device 108. The external air quenching device 108 is generally configured to provide an air flow around the exterior of the tubular 106 to quench the tubular in the HAZ 110. The air flow can entrain ambient air to form a larger combined airflow. The larger induced airflow stream can then contact an interior surface of the tubular 106 to quench the HAZ once the heating cycle has been completed.

Figure 3:
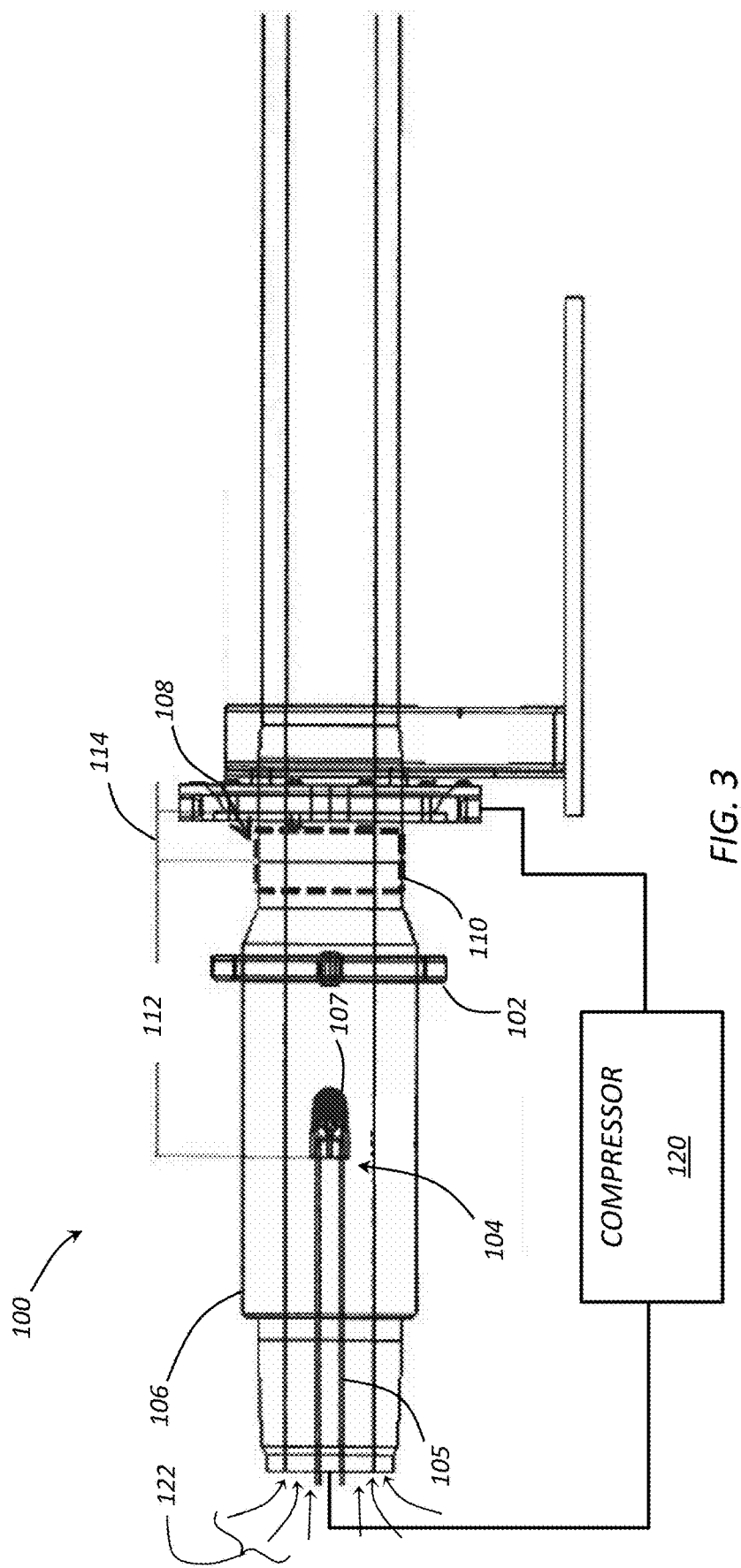
FIG. 3 shows another schematic diagram of a system for air quenching a tubular according to an embodiment.

The external air quenching device 108 may be configured to be placed about or over the external surface of the tubular 106. In order to position the external air quenching device with respect to the HAZ, the external air quenching device 108 may be coupled to a bracket or other retainer that is moveable along the axis of the tubular 106. This may allow the external air quenching device 108 to be placed about the tubular 106 and moved into position with respect to the HAZ 110. The external air quenching device 108 can be moved so as to be positioned at or near the HAZ 110 during the quenching process. Thus, external air quenching device 108 is disposed about the exterior of tubular 106 and is configured to reciprocate along the tubular 106. In an embodiment, the external air quenching device 108 may be positioned at a distance (e.g., distance 114 as shown in FIG. 3) between about 0.5 inches and about 20 inches from the HAZ 110 during the quenching process. During the quenching process, a ratio of the distance (e.g., distance 114 as shown in FIG. 3) between the external air quenching device 108 and the centerline of the HAZ 110 to the distance 112 between the internal air quenching device 104 and the centerline of the HAZ 110 may range from about 0.05 to about 0.5 or between about 0.1 and about 0.3. The exact spacing and distance between each air quenching device and the HAZ 110 may vary based on the specifics of the amount of air used in each device, the diameter and thickness of the tubular 106, and/or the design of each air quenching device.

In order to allow room for the heat source 102, the external air quenching device 108 may be positioned away from the HAZ 110 during the heating cycle and then moved closer to the HAZ 110 during the quenching process. The external air quenching device 108 may be positioned upstream of the HAZ 110 with respect to the direction of the resulting cone of air so that an air stream leaving the external air quenching device 108 may mix with the induced airflow prior to the combined air stream passing over the exterior surface of the tubular 106 in the HAZ 110.

Figure 2:
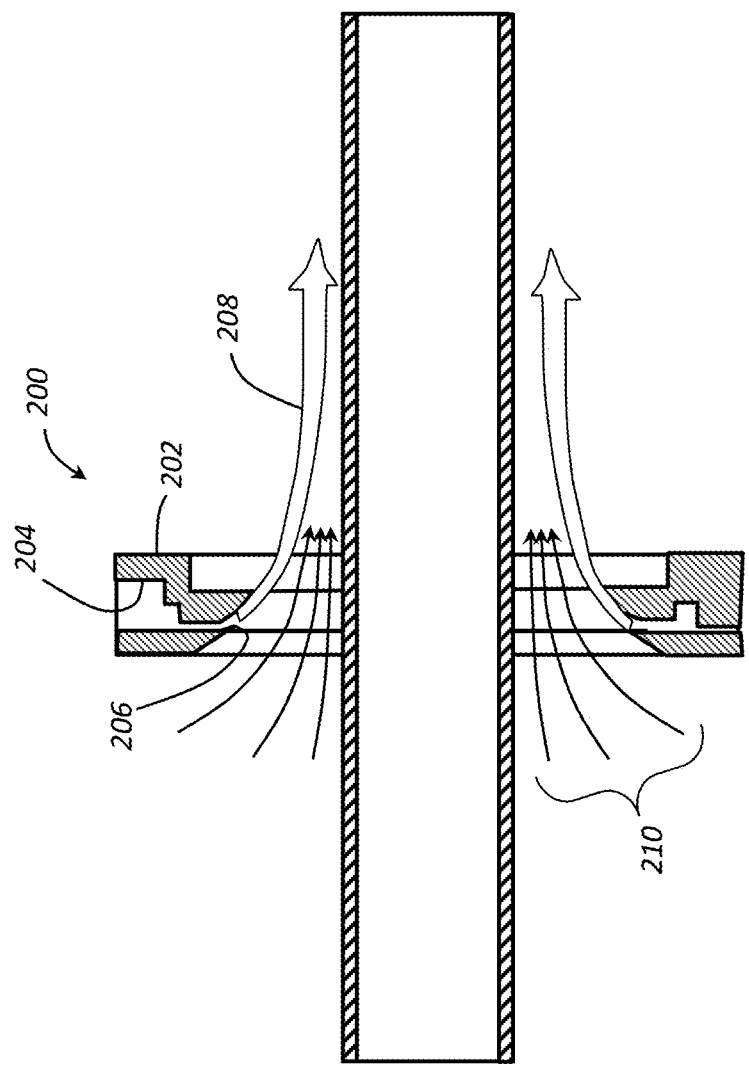
FIG. 2 shows a schematic diagram of an embodiment of an external air quenching device.

In an embodiment shown in FIG. 2, the external air quenching device 200 can comprise an annular ring 202 disposed about the tubular 106 and be coupled to one or more sources of compressed air using an air inlet 204. A central passage extending about the circumference of the annular ring 202 can provide fluid communication between the air inlet 204 and an annular opening 206 disposed about the inner circumference of the annular ring 202. The annular opening 206 may be angled to direct a resulting cone of air 208 towards and along the outer circumference of the tubular 106.

When compressed air is supplied to the central passage, the air may pass through the annular opening 206 to form a cone of air 208 directed inwards towards the tubular 106. The cone may be tilted between about 10 degrees and about 80 degrees inwards from an axis parallel to the longitudinal axis of the tubular 106. As shown, the resulting cone of air 208 may generally converge on the tubular 106 and draw in ambient air 210 upstream of the annular ring 202, resulting in a larger, mixed airflow stream. In an embodiment, the resulting airflow stream passing along the exterior surface of the tubular 106 in the HAZ 110 may have a volumetric flowrate that is larger than the volume of air passing through the annular ring 202. The ratio of the volume of the compressed air passing through the annular ring 202 to the volume of ambient air 210 entrained and drawn into the mixed stream passing over the exterior of the tubular 106 may vary between about 1:15 to about 1:20. In an embodiment, the airflow passing through the annular ring 202 may range from about 70 standard cubic feet per minute (SCFM) to about 125 SCFM. The airflow may vary based on the geometry of the tubular 106 as well as the specifics of the annular ring 202.

In some embodiments, the external air quenching device 108 may result in an airstream that flows over the external surface of the tubular 106 in a Coanda flow pattern. In general, a Coanda flow results in a fluid stream flowing along a surface and remaining adjacent the surface due to the flow effects. The presence of the moving fluid may cause the fluid to "stick" to the surface, thereby allowing the fluid to flow along the surface for an extended distance. As shown in FIG. 2, the resulting cone of air 208 may develop a flow stream along the exterior surface of the tubular 106, and the flow stream may continue to flow along the surface of the exterior of the tubular 106 for a distance down the length of the tubular 106. This may improve the overall heat transfer between the tubular 106 and the air stream generated by the annular ring 202.

As shown in FIG. 1, both the internal air quenching device 104 and the external air quenching device 108 may be moveable with respect to the tubular 106. The resulting airflow streams may be co-current or countercurrent. In an embodiment, the airflow stream generated by the internal air quenching device 104 may flow counter-currently with respect to the air flow stream generated by the external air quenching device 104.

The use of the air quenching may result in a cooling of the HAZ 110 from the treatment temperature to below a threshold temperature. For example, the HAZ 110 may be quenched from the treatment temperature of over 1,000° F. to below a threshold temperature of between about 100° F. and about 300° F. A faster quenching rate is generally preferred in order to retain the material properties. The use of the induced airflows resulting from the internal and external air quenching devices 104, 108 may aid in increasing the quenching rate. Further, the use of the induced airflow streams may also allow the cooling rate of the internal surface of the tubular 106 to track the cooling rate of the external surface of the tubular 106.

The relative cooling rate achieved through the use of both the internal air quenching device 104 and the external air quenching device 108 may be similar. In an embodiment, the cooling rate of the internal surface of the tubular 106 may range from about 10° F./sec to about 20° F./sec. In an embodiment, the cooling rate of the external surface of the tubular 106 may range from about 10° F./sec to about 25° F./sec. Further, the ratio of the cooling rate of the external surface of the tubular to the cooling rate of the internal surface of the tubular 106 may range from about 0.5 to about 2.0 or between about 0.7 and about 1.5. In some embodiments, the time to reach the threshold cooling temperature at the exterior surface of the tubular 106 may be within about 20% or within about 15% of the time to reach the same threshold cooling temperature at the interior surface of the tubular 106. In some embodiments, the cooling rates may be substantially linear with respect to each other. This may result in a more rapid and even cooling of the HAZ 110 to produce more consistent material and mechanical properties than previous systems.

In some embodiments, the use of the internal air quenching device 104 and the external air quenching device 108 may allow for proportional cooling of the HAZ 110. As used herein, proportional cooling refers to a substantially similar cooling rate (degrees per unit of time) between the interior and exterior surfaces of the tubular 106 in the HAZ 110. While the absolute temperatures may vary or be offset by some amount, the cooling rates may be similar. This may result in a temperature differential between the interior and exterior surface of the tubular 106 remaining within a threshold during the quenching process. In an embodiment, the difference between an initial temperature difference between the internal and external temperatures of the tubular 106 in the HAZ 110 at the beginning of the quenching process and the final temperature difference between the internal and external temperatures of the tubular 106 in the HAZ 110 at the end of the quenching process (e.g., at the time at which the internal and/or external temperature reaches the threshold) may be less than about 50° F., less than about 25° F., or less than about 10° F.

The ability to rapidly cool the tubular 106 and/or proportionally cool the tubular 106 may allow thicker tubulars to be heat treated and cooled while maintaining acceptable material properties. In general, as the wall thickness of the tubular 106 increases, the ability to cool the tubular 106 at a sufficient rate to lock in the desired material properties becomes more difficult. The use of the internal air quenching device 104 and the external air quenching device 108 may allow for a thicker tubular to be heat treated and cooled at an acceptable rate. Using the system described herein, wall thicknesses up to about 1.75 inches, up to about 2 inches, up to about 2.5 inches, or up to about 3 inches can be heat treated and quenched. In some embodiments, tubulars having these wall thicknesses can be quenched while maintaining a proportional cooling between the internal and external surfaces of the tubular 106.

Referring to FIG. 1, a process for air quenching the tubular 106 may begin by positioning the heat sources 102 over the portion of the tubular 106 to be heat treated. As can be seen, the external air quenching device 108 may be positioned away from the portion of the tubular 106 to be heat treated to allow the heat source 102 to be positioned about the tubular 106 at the desired location. Once in position, the heat source 102 (e.g., an induction coil, etc.) can be activated to heat a portion of the tubular 106 to a treatment temperature and create a HAZ 110. The heat source 102 may be used to maintain the temperature of the HAZ 110 for a desired time.

When the HAZ 110 has been heated for the desired period of time, the heat source 102 can be deactivated and repositioned about the tubular 106. As shown in FIG. 3, the heat source 102 may be moved away from the HAZ 110 to allow the external air quenching device 108 to be repositioned with respect to the HAZ 110. Depending on the design of the system 100, the internal air quenching device 104 can be repositioned with respect to the HAZ 110 as needed.

Once the external air quenching device 108 is in position with respect to the HAZ 110, compressed air can be supplied to the external air quenching device 108. A jet of air can then be used to induce a larger airflow that contacts the exterior surface of the tubular 106 in the HAZ 110. In an embodiment, the external air quenching device 108 comprises an annular ring that creates a cone of air directed towards the exterior surface of the tubular 106. The cone of air may entrain ambient air to create a larger combined airflow that flows over the HAZ 110. In an embodiment, the airflow over the exterior of the tubular 106 may pass along the outer surface of the tubular 106 past the HAZ 110, which may occur in a Coanda Effect flow. The heat within the tubular 106 in the HAZ 110 can then be transferred to the combined airflow to create a cooling effect at the exterior surface of the tubular 106.

Similarly, once the internal air quenching device 104 is in position with respect to the HAZ 110, compressed air can be supplied to the internal air quenching device 104. The internal air quenching device 104 can comprise a nozzle that emits a jet of air. The jet of air may induce a larger airflow within the interior of the tubular 106, which may then pass over the interior surface of the tubular 106 in the HAZ 110. The larger airflow may result from ambient air 122 being drawn into the interior of the tubular 106 as a result of the jet of air being emitted by the nozzle 107. The heat within the tubular 106 in the HAZ 110 can then be transferred to the larger airflow stream to create a cooling effect at the interior surface of the tubular 106. The jet of air and the larger airflow stream may be oriented counter-current to the airflow on the exterior of the tubular 106.

In response to the airflow on the interior and exterior surfaces of the tubular 106 in the HAZ 110, the wall of the tubular 106 may cool down to a threshold temperature. For example, the HAZ 110 may be cooled to a temperature below around 200° F. In an embodiment, the use of both air quenching devices may provide a relatively uniform cooling rate between the interior and exterior surfaces, and the cooling of the HAZ 110 may be proportional between the interior and exterior surfaces.

EXAMPLE

The following example is given to demonstrate the practice of an embodiment described herein. It is understood that the example is given by way of illustration and is not intended to limit the specification or the claims in any manner.

Example 1

As an example, a comparison of the system described herein was performed relative to an air quenching system having a lower air volume. The lower volume system generally comprises an interior tubular diffuser having a plurality of holes disposed about the circumference of the diffuser for emitting air. The diffuser was located adjacent to the HAZ and emitted compressed air outwardly at the interior surface of the tubular. The exterior surface was cooled using a plurality of nozzles emitting compressed air towards the HAZ.

For the comparative test, a 6 and 5/8 inch pipe having a 1 inch wall thickness was used. Thermocouples were welded to the HAZ to monitor the temperature of the interior surface and the exterior surface of the pipe. Using the lower volume system, the time to reach an inner surface temperature of less than 200° F. was about 240 seconds. The outer diameter temperature was quenched to a temperature of less than 200° F. in about 100 seconds. This demonstrates that the cooling was not proportional and the cooling time for the interior surface was over twice as long as the cooling time for the exterior surface.

Using the system described herein with the same pipe resulted in the interior surface being cooled to less than 200° F. in about 90 seconds. Further the inner surface temperature and the outer surface temperature quenched at similar rates with the outer diameter reaching a temperature of less than 200° F. in about 80-85 seconds. The cooling rates between the inner and outer surfaces were very similar and demonstrated a nearly linear relationship to 200° F. Further, laboratory testing indicated that the Charpy impact results were improved using the system described herein.

Exemplary embodiments are disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification, and the claims are exemplary embodiment(s) of the present invention.

What is claimed is:

1. A system for air quenching a heat treated element, the system comprising:
   a tubular component having a longitudinal axis and a heat affected zone;
   an internal air quench device moveably disposed within the interior of the tubular component, wherein the internal air quench device comprises a nozzle configured to convert compressed air into a jet of air within the tubular component and induce an airflow within the tubular component, wherein the nozzle is configured to emit the jet of air along a longitudinal axis of the tubular component with an outward deflection from the longitudinal axis of between 0 and 45 degrees; and
   an external air quench device disposed about the tubular component and moveable relative to the tubular component;
   wherein the internal air quench device and the external air quench device are axially spaced apart, and wherein the internal air quench device is moveably disposed on a first side of the heat affected zone and the external air quench device is moveably disposed on a second side of the heat affected zone that is axially opposite the first side of the heat affected zone such that the heat affected zone is axially positioned between the internal air quench device and the external air quench device;
   wherein the internal air quench device is configured to emit a jet of air axially toward the external air quench device and the external air quench device is configured to emit a jet of air axially toward the internal air quench device.

2. The system of claim 1, further comprising an induction coil disposed about the tubular component, wherein the induction coil is configured to heat the tubular and create the heat affected zone.

3. The system of claim 2, wherein the heat affected zone includes a weld line between two tubulars.

4. The system of claim 1, wherein the tubular component comprises a drill pipe, a drill collar, a production pipe, a tool joint, or a downhole tool housing.

5. The system of claim 1, further comprising a compressed air source, wherein the nozzle and the external air quench device are in fluid communication with the compressed air source.

6. The system of claim 1, wherein the internal air quench device is disposed a first longitudinal distance away from a centerline of the heat affected zone, wherein the external air quench device is disposed a second longitudinal distance away from the centerline of the heat affected zone, and wherein a ratio of the first longitudinal distance to the second longitudinal distance ranges from about 0.05 to about 0.5.

7. The system of claim 1, wherein the external air quenching device comprises an annular ring disposed about the tubular component, wherein the annular ring is configured to generate a cone of air about the tubular component.

8. The system of claim 1, wherein the tubular component has a wall thickness of up to about 3 inches.

9. The system of claim 1, wherein the nozzle is configured to generate the jet in the form of a cone or fan.

10. A system for air quenching a heat treated element, the system comprising:
    a tubular component having a longitudinal axis;
    an internal air quench device moveably disposed within the interior of the tubular component, wherein the internal air quench device comprises a nozzle configured to emit a jet of air and induce an airflow within the tubular component; and
    an external air quench device disposed about the tubular component and moveable relative to the tubular component, wherein the external air quench device comprises an annular ring including an annular opening extending circumferentially about the tubular component, wherein the annular opening of the annular ring is configured to generate a cone of air about the tubular component;
    wherein the tubular comprises a heat affected zone axially positioned between the internal air quench device and the external air quench device, wherein the internal air quench device is disposed a first longitudinal distance away from a centerline of the heat affected zone, wherein the external air quench device is disposed a second longitudinal distance away from the centerline of the heat affected zone, and wherein a ratio of the first longitudinal distance to the second longitudinal distance ranges from about 0.05 to about 0.5.

11. The system of claim 10, wherein the external air quench device further comprises a central passage extending about the circumference of the annular ring, wherein the central passage is in fluid communication with an air inlet and the annular opening.

12. The system of claim 10, wherein the annular opening is tilted inwards between about 10 and about 80 degrees from an axis parallel to a longitudinal axis of the tubular component.

13. The system of claim 10, further comprising an induction coil disposed about the tubular component, wherein the induction coil is configured to heat the tubular and create a heat affected zone.

14. The system of claim 13, wherein the heat affected zone includes a weld line between two tubulars.

15. The system of claim 10, wherein the tubular component comprises a drill pipe, a drill collar, a production pipe, a tool joint, or a downhole tool housing.

16. The system of claim 10, further comprising a compressed air source, wherein the nozzle and the external air quench device are in fluid communication with the compressed air source.

17. The system of claim 10, wherein the external air quenching device comprises an annular ring disposed about the tubular component, wherein the annular ring is configured to generate a cone of air about the tubular component.

18. The system of claim 10, wherein the tubular component has a wall thickness of up to about 3 inches.

* * * * *